Dec. 9, 1958  J. H. O'BRIEN  2,863,432
VALVE TAPPET MECHANISM
Filed July 18, 1957  3 Sheets-Sheet 2

INVENTOR.
JAMES H. O'BRIEN
BY
Clifford L. Sadler
ATTORNEY

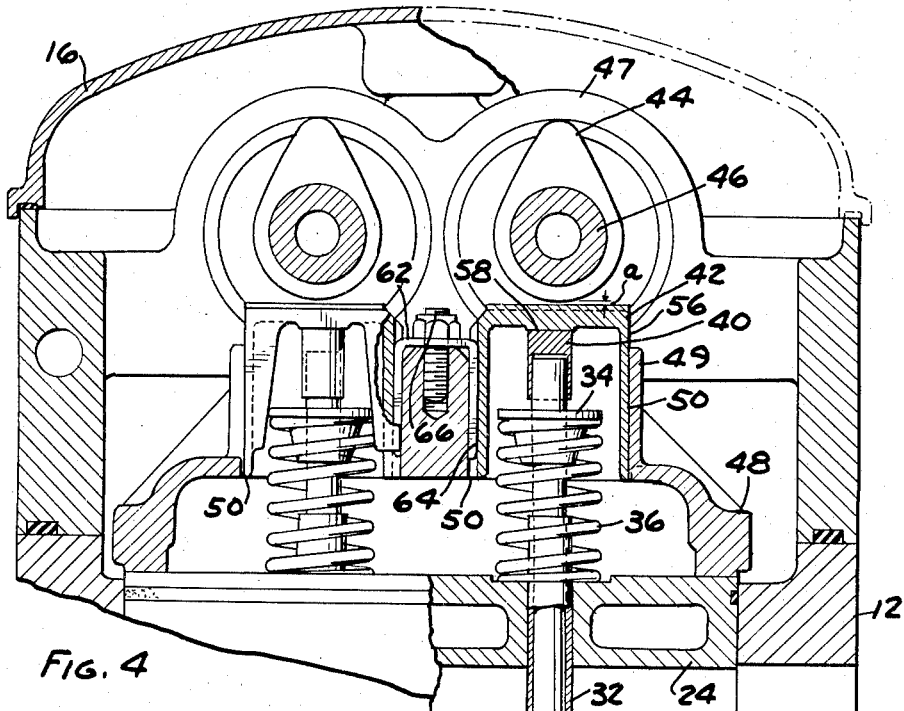
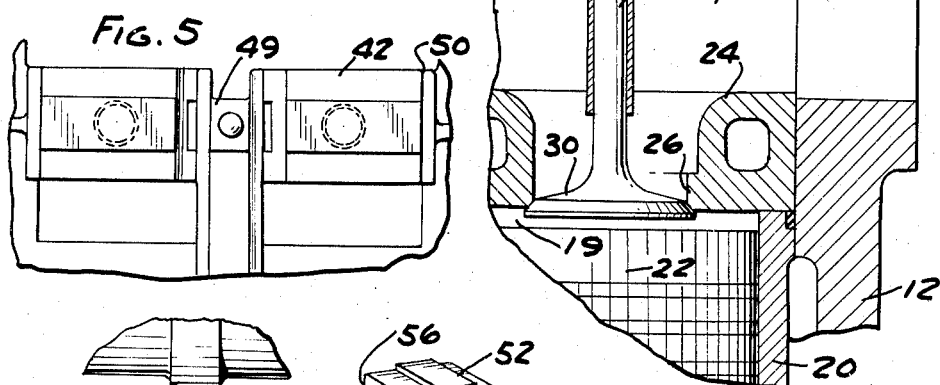
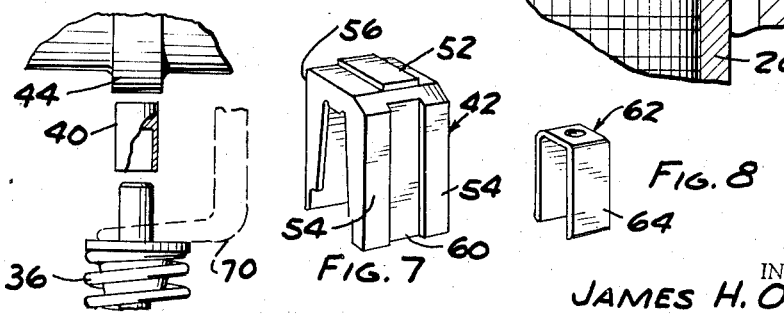

United States Patent Office 2,863,432
Patented Dec. 9, 1958

2,863,432

VALVE TAPPET MECHANISM

James H. O'Brien, Detroit, Mich., assignor to Curtiss-Wright Corporation, Utica, Mich., a corporation of Delaware Application July 18, 1957, Serial No. 674,269

5 Claims. (Cl. 123—90)

The present invention relates to valve tappet mechanisms and more particularly to means for obtaining simplified adjustment of the valve tappet clearance in heavy duty engines.

This invention is directed particularly to heavy duty diesel engines where conventional valve tappet adjusting means, such as employed in automotive engines, are not acceptable for heavy duty applications. In such engines the clearance between the cam and cam follower is usually determined by the selective application of shims. The replacement of these shims is an extremely difficult job in the case of an overhead valve engine where the camshafts are located directly above the tappet assembly. It is necessary in such situations to remove the entire camshaft assembly to obtain access to the tappets.

In view of the foregoing state of the art, it is an object of the present application to provide in an engine a simplified valve tappet mechanism wherein the tappet clearance of the engine can be adjusted with a minimum dismantling of the engine itself.

It is a more specific object of the present invention to provide novel valve tappet adjustment means for a heavy duty overhead cam engine, in which removal of the camshafts is not a prerequisite to the adjustment of the valve clearance.

These and further objects and advantages of the present invention will become apparent from the following detailed description and the accompanying drawings in which:

Figure 4 is a sectional view taken along section lines 4—4 of Figure 2;

Figure 5 is an enlarged plan view of the cam followers which form a part of the present invention;

Figure 6 discloses the assembly of a spacer shim in the tappet mechanism;

Figure 7 is a perspective view of the cam follower, and

Figure 8 is a perspective view of the locking guide.

Figure 1:
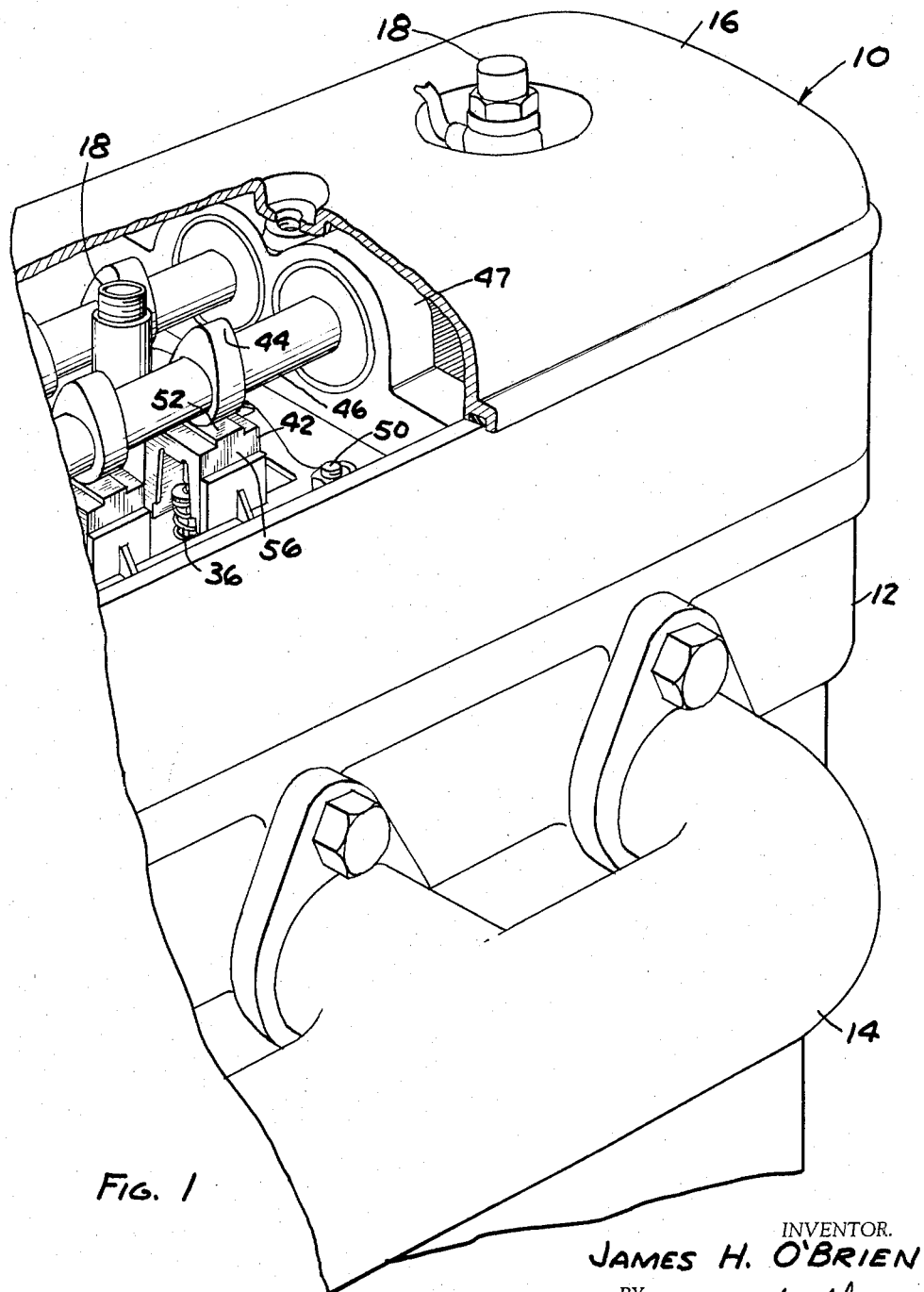
Figure 1 is a perspective partial view of a diesel engine having a portion of its valve cover cut away to disclose its camshaft and valve assembly.
Figure 2:
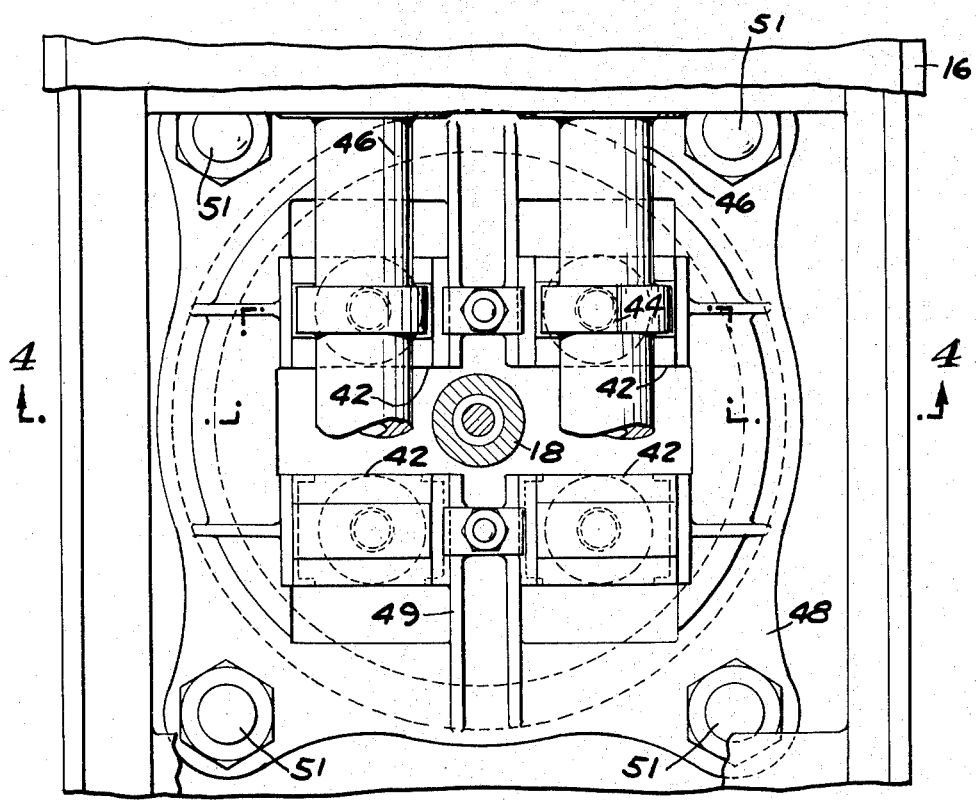
Figure 2 is a top plan view of the camshaft, tappet and cylinder head construction of the engine of Figure 1.

Referring now to the drawings for a more detailed description wherein like reference numerals refer to like parts, Figure 1 discloses in perspective a multi-cylinder heavy duty diesel engine 10 incorporating the present invention. The engine 10 has a cylinder block 12, an exhaust manifold 14 and an overhead valve cover 16. Fuel injectors 18 are provided for each of the engine combustion chambers 19.

The combustion chamber 19 is defined by a cylinder liner 20 which fits securely within the cylinder block 12, a piston 22 slidably received within the cylinder liner 20, and a cylinder head 24 forming the top closure for the combustion chamber 16. The cylinder head 24 is provided with ports 26 therein for the admission of combustion supporting air or the exhaustion of the gaseous waste products of combustion. Passage 21 in the head 24 connects the exhaust ports with the exhaust manifold 14. The ports 26 are sealed by poppet valves 28 having valve heads 30 which seat against the ports 26.

The valve 28 is slidably received in valve guide 32 which in turn is secured to the cylinder head 24. The stem end of the valve 28 has a spring retainer 34 secured to it. Disposed concentrically about the valve 28 and between the cylinder head 24 and the spring retainer 34 is a valve spring 36 which urges the valve head 30 to tightly seat against the port 26.

Fitted over the stem end of the valve 28 is a cup-shaped spacer 40 which has a cam follower 42 resting on it. The cam follower 42 engages a rotating cam lobe 44 carried by a camshaft 46. The camshafts 46 are rotatably received in bearing blocks 47. Rotation of the cam 44 causes the cam follower 42, the spacer 40 and the valve 28 to effect a reciprocatory motion as it slides up and down in response to the eccentric radius of the cam 44.

A retainer 48 is provided with a super-structure 49 to slidably receive the cam followers 42. The structure for engaging the followers 42 comprises a plurality of vertical surfaces 50 arranged in parallel pairs. The surfaces 50 of each pair face each other and slidably engage the vertical sides of the cam follower 42.

The cam followers 42 are of a general U-shape construction having parallel vertical sides 54, 56 and a flat horizontal top 52. The horizontally machined face 52 forms the bearing surfaces for the sliding action of the cam 44 against the follower 42. The cam follower 42 is provided with parallel, outwardly facing vertical surfaces 54 and 56 which complement the surfaces 50 of the cylinder retainer 48. The inside of the cam follower 42 has a boss 58 which butts against the end of the spacer shim 40. The distance between the flat surfaces 52 and 58 is accurately controlled by machining operations during the fabrication of the retainer 42.

Vertical face 54 on the cam follower 42 has a vertically groovel portion 60 relieved from its face. The valve assemblies for each of the cylinders are arranged in pairs with the associated cam followers 42 having their vertical faces 54 inwardly directed towards each other. Detachably secured to the super-structure 49 is a U-shaped locking guide 62 which has downwardly directed sides 64. The locking guide 62 is secured as by a bolt 66 to an upstanding portion of cylinder retainer 48. When so secured the two legs or sides 64 of the locking guide 62 lie along back-to-back faces 50 of adjacent tappet assemblies. The legs 64 form a complementary rail for the grooves 60 of followers 42.

In operation, action of the cam lobe 44 against the face 52 of the cam follower 42 forces it and the valve 28 to be directed downwardly while the spring 36 urges it to assume the original position. As the follower 42 slides upwardly or downwardly its vertical faces 54 and 56 slide on surfaces 50 of the cylinder retainer 48. Locking guide 62 forms a restraint on the cam follower 42 so that only vertical movement is possible.

The clearance "a" between the minimum diameter of the cam 44 and the face 52 of the cam follower 42 when it is in its highest position (when the valve head 30 is seated) is a critical dimension. The correct clearance "a" must be maintained within a close tolerance to insure the proper seating of the valve head 30 in the port 26. To assure this proper clearance a spacer shim 40 of predetermined thickness is provided between the stem end of the valve 28 and the follower 42. By selecting the spacer 40 of proper thickness the correct clearance can be maintained; however, as the engine is used and the various elements wear, the clearance will vary from its correct value and it will become necessary to replace the spacer 40 with one of differing dimensions so that the original and correct clearance can be restored.

Prior to the present invention in engines of the overhead camshaft type it was necessary to remove the camshaft to obtain access to the spacer shims fitted on the butt end of the valve stem; however, in accordance with the present invention removal of the camshaft is not necessary.

To replace the existing spacer shim 40 in an engine with one of a different dimension, it is first necessary to remove the valve assembly cover 16 from the engine 10. The existing clearance between the cam 44 and the follower 42 is determined by a feeler gauge in a well-known manner. Knowing the size of the existing spacer, the existing and desired clearances, the replacement spacer of proper thickness can be selected.

Figure 3:
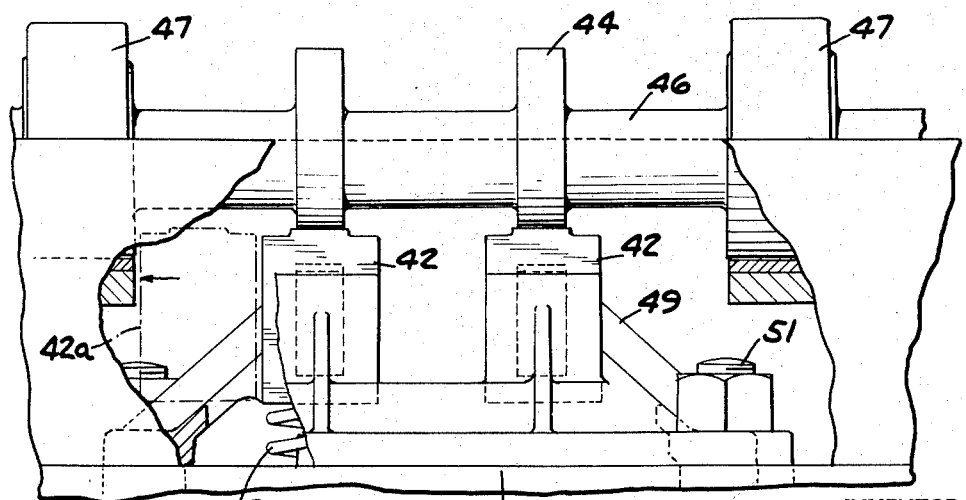
Figure 3 is a side elevational view of the structure disclosed in Figure 2.

To remove the spacer 40, it is first necessary to remove the follower 42. This is accomplished by unthreading bolt 66 and withdrawing the locking guide 62. Figure 5 discloses a plan view of the tappet assembly with the guide 62 removed. With the guide 62 missing the follower 42 may be easily slid horizontally out from under the cam 44. This step is seen in Figure 3 where 42a is a dotted line representation of the follower 42 being removed. The old spacer 40 is removed by inserting a tool 70 on top of the spring retainer 34 and through the use of force depressing the valve 28. This step is disclosed in Figure 6. The old spacer 40 is then easily removed and replaced by a selected spacer 40 of proper dimensions. After the new cup-shaped spacer 40 has been replaced over the stem end of the valve 28, the tool 70 is released and the tappet components are reassembled. Having selected a spacer 40 of proper dimensions the clearance "a" will be within the prescribed limits.

This foregoing described construction provides a rugged tappet assembly suitable for heavy duty engines which can be adjusted without the necessity of extensive dismantling of the engine. Only a very minimum number of parts are removed to effect the replacement operation.

The invention of this patent may be incorporated in engines of varying design, however, it has been described herein for purposes of illustration in association with a diesel engine having two inlet and two outlet ports; and further having overhead camshafts which pass directly above the inlet and exhaust ports, the camshafts acting directly upon the valves rather than through a system of rocker arms and push rods. It is to be understood that the present invention is applicable to other configuration as well as to that disclosed in the drawings, and still remain within the scope and spirit of this invention as defined in the appended claims.

I claim:

1. In an internal combustion engine having exhaust and intake ports, said ports being arranged in side by side paired relationship, upstanding poppet valves sealing said ports, means for actuating said valves in a reciprocatory manner, said means including cam carrying shafts disposed above said valves, spacer elements and cam followers disposed between said shafts and said valves, said cam followers having parallel vertical sides slidably engaging a portion of said engine structure, a detachable guide member disposed between adjacent cam followers, said guide member slidably engaging said followers and restricting their motion to vertical oscillation.

2. In an internal combustion engine having cam actuated poppet valves, tappet means disposed between said cam and said valve, said means including a generally U-shaped cam follower having parallel sides, one side of said follower having a longitudinal groove therein, a guide member slidably engaging said groove and detachably secured to said engine.

3. A tappet mechanism for an internal combustion engine comprising a cam follower of generally U-shape and having parallel sides, a poppet valve having a flat head end and a rod-like stem end, a cup-shaped spacer disposed over said stem end between said valve and said follower, cam means slidably engaging said follower, guide means restricting said follower to reciprocatory motion, and detachable means for disengaging said guide means from said follower.

4. A valve actuating linkage system comprising in series a valve stem, a cup-shaped spacer, a cam follower, and an eccentric cam, said follower being of generally U-shape and having parallel sides, one side of said follower having a longitudinal groove therein, and a guide member slidably engaging said groove.

5. In an internal combustion engine having two upstanding poppet valves, each of said valves having a flat head end and a rod-like stem end, said valves being disposed in a side by side relationship, engine structure separating said valves, cup-shaped spacer elements located over the stem end of said valves, three aligned U-shaped members having their longitudinal sides extending in a common direction, the inner one of said members being detachably stationary and slidably engaging the outer members, said spacer elements butting against said outer U-shaped members.

References Cited in the file of this patent

FOREIGN PATENTS 933,961   Germany _____ Oct. 6, 1955